UNITED STATES PATENT OFFICE.

LEMUEL STEPHENS, OF PHILADELPHIA, PENNSYLVANIA.

IMPROVEMENT IN FERTILIZERS.

Specification forming part of Letters Patent No. 28,516, dated May 29, 1860.

*To all whom it may concern:*

Be it known that I, LEMUEL STEPHENS, of Philadelphia, in the county of Philadelphia and State of Pennsylvania, have invented a new and Improved Compost which I denominate "Phuine;" and I do hereby declare that the following is a full, clear, and exact description of the same.

My phuine is a composition consisting of the hereinafter named ingredients mixed together in the following proportion: decomposed animal matter, twelve hundred pounds; animal charcoal, one hundred and fifty to two hundred pounds; sombrero guano, two hundred pounds; Peruvian guano, one hundred and seventy-five pounds; sulphate of ammonia, twenty-five pounds; common salt, one hundred pounds; solution of bone in muriatic acid, fifty gallons.

The decomposed animal matter is obtained by collecting hair, bristles, hoofs, wool waste, leather scraps, &c., in large heaps under cover, together with blood and garbage from slaughter-houses. These heaps are left to ferment from four to six months, according to the temperature, at the end of which time the mass has become, for the most part, decomposed and pretty dry. Not only the water previously existing in the heaps, but also the water formed from its elements in the process of decay, has been driven off, the ammonia and the carbonic acid existing or formed in the heaps have united, and by keeping the entire surface of the heaps continually wet with diluted sulphuric acid during the whole time of fermentation the ammonia is converted into a sulphate, and thereby it is fixed. The mass thus obtained is coarsely ground and sifted, and that proportion which passes readily through the screen is what I denominate "decomposed animal matter." It is placed aside to form the largest ingredient in my phuine. The rest of this animal matter which does not pass through the screen, consisting chiefly of fragments of hoof and horn which have not yielded to the fermenting process, is then distilled in cylindrical iron retorts about ten feet long and two feet in diameter.

With each retort is connected a condensing apparatus, by means of which the carbonate of ammonia and other condensable products of the distillation are obtained in a receiver, and afterward returned to the animal charcoal from the retorts. Thus prepared and saturated the animal charcoal is mixed with the decomposed animal matter in the proportion above designated.

The sombrero guano, before using it for my phuine, is converted into a superphosphate of lime by treating the quantity above stated with sixty pounds (60 lbs.) of sulphuric acid diluted with an equal weight of water. The Peruvian guano is added in its natural state, and so is sulphate of ammonia and common salt.

The solution of bone in muriatic acid is partly neutralized by the addition of forty pounds of crude potash, and it is now boiled down to one-third of the original quantity, and thus prepared it is poured upon the heap of ingredients above described. All the ingredients thus prepared are now thoroughly mixed and reduced by grinding them together, and the phuine is ready for use.

The utility of this composition is based on the various methods of treating animal matter, as above described, by which all its fertilizing qualities are retained and concentrated by the expulsion of its least valuable elements, and at the same time the animal matter is rendered more soluble and active. A great advantage is also derived from the various states of combination in which phosphoric acid is contained in the various ingredients of this compound, and from the variety and proportions of the chemical salts contained in my composition, so united as to render it a nuetral and non-volatile substance, and capable of supplying the wants of vegetable life.

The several ingredients of my phuine are furthermore of such a nature that they can be prepared or bought with little expense, its chief ingredient being prepared from refuse, which otherwise is entirely useless or in the way, so that the whole forms a cheap and useful substitute for other more expensive fertilizers.

I do not claim broadly the use of sulphuric acid for the decomposition of animal and other matters.

Having thus described my invention, I claim and desire to secure by Letters Patent—

As an improved article of manufacture, the phuine made substantially as herein set forth.

LEMUEL STEPHENS.

Witnesses:
FRANCIS A. BREGY,
GEORGE STUART.